(12) United States Patent
Zhang et al.

(10) Patent No.: US 11,374,613 B2
(45) Date of Patent: Jun. 28, 2022

(54) ACTIVE INTERFERENCE CANCELLATION APPARATUS, SIGNAL ISOLATION CONTROL APPARATUS AND METHOD OF ACTIVELY CANCELLING INTERFERENCE

(71) Applicant: u-blox AG, Thalwil (CH)

(72) Inventors: Chunqing Zhang, Bristol (GB); Leo Laughlin, Bristol (GB)

(73) Assignee: U-BLOX AG, Thalwil (CH)

( * ) Notice: Subject to any disclaimer, the term of this patent is extended or adjusted under 35 U.S.C. 154(b) by 0 days.

(21) Appl. No.: 17/042,397

(22) PCT Filed: Mar. 29, 2018

(86) PCT No.: PCT/EP2018/058214
§ 371 (c)(1),
(2) Date: Sep. 28, 2020

(87) PCT Pub. No.: WO2019/185157
PCT Pub. Date: Oct. 3, 2019

(65) Prior Publication Data
US 2021/0058110 A1     Feb. 25, 2021

(51) Int. Cl.
*H04B 1/525*     (2015.01)
*H04B 1/58*     (2006.01)

(52) U.S. Cl.
CPC ............ *H04B 1/525* (2013.01); *H04B 1/582* (2013.01)

(58) Field of Classification Search
CPC .............................. H04B 1/525; H04B 1/582
See application file for complete search history.

(56) References Cited

U.S. PATENT DOCUMENTS

2013/0294295 A1  11/2013  Viswanathan et al.
2015/0222412 A1*  8/2015  Laughlin ............... H04B 1/581
                                                              370/252
2016/0126985 A1   5/2016  Tian et al.

FOREIGN PATENT DOCUMENTS

WO     WO 2016/128032 A1     8/2016

OTHER PUBLICATIONS

International Search Report, issued by the European Patent Office, in corresponding International Application No. PCT/EP2018/058214, dated Dec. 3, 2018, 2 pages.
(Continued)

*Primary Examiner* — Natasha W Cosme
(74) *Attorney, Agent, or Firm* — Finnegan, Henderson, Farabow, Garrett & Dunner LLP

(57) ABSTRACT

An apparatus includes a receiver chain includes an input node and a transmitter chain comprising a tap and output nodes. An auxiliary transmitter chain comprises an auxiliary input node coupled to the tap node, an adaptive filter unit and a signal output coupled to the input node. The filter unit includes an interpolation processor, and an adaptive filter and a coefficient processor coupled to the receiver chain and the adaptive filter. The transmitter chain generates a first waveform comprising a plurality of frequency-separated signals. Contemporaneously, the auxiliary chain applies a second waveform comprising another plurality of frequency-separated signals at the input node. The receiver chain receives a composite waveform comprising a waveform coupled from the output node and the second waveform. The first waveform lacks signals required for determination of coefficients of the filter whose frequencies coincide with the another plurality of signals of the second waveform.

21 Claims, 8 Drawing Sheets

(56) References Cited

OTHER PUBLICATIONS

Written Opinion of the International Search Authority, issued by the European Patent Office, in corresponding International Application No. PCT/EP2018/058214, dated Dec. 3, 2018. (7 pages).
B. van Liempd et al: "A Dual-Notch +27dBm Tx-Power Electrical-Balance Duplexer," UTC from 2014 IEEE Xplore, 4 pages.
Mina Mikhael et al.: "An In-Band Full-Duplex Transceiver Prototype with an In-System Automated Tuning for RF Self-Interference Cancellation," 2014 $1^{st}$ International Conference on 5G for Ubiquitous Connectivity (5GU), 6 pages.
B. van Liempd et al.: "RF Self-Interference Cancellation for Full-Duplex," 2014 $9^{th}$ International Conference on Cognitive Radio Oriented Wireless Networks (crowncom). 6 pages.
Sherif H. Abdelhalem et al.: "Tunable CMOS Integrated Duplexer With Antenna Impedance Tracking and High Isolation in the Transmit and Receive Bands," IEEE Transactions on Microwave Theory and Techniques, vol. 62, No. 9, Sep. 2014. 13 pages.
Leo Laughlin et al.: "A Widely Tunable Full Duplex Transceiver Combining Electrical Balance Isolation and Active Analog Cancellation," UTC from 2015 IEEE Xplore, 5 pages.
Tom Vermeulen et al.: "Real-Time RF Self-Interference Cancellation for In-Band Full Duplex," 2015 IEEE International Symposium on Dynamic Spectrum Access Networks (DySPAN), 2 pages.
G. Castellano et al.: "A Low Power Control System for Real-Time Tuning of a Hybrid Transformer-based Receiver," 2016 IEEE, 4 pages.
Enrico Manuzzato et al.: "Digitally-Controlled Electrical Balance Duplexer for Transmitter-Receiver Isolation in Full-Duplex Radio," VDE Verlag GmbH, Berlin, Offenbach, Germany, (2016). 8 pages.
Leo Laughlin et al.: "Passive and Active Electrical Balance Duplexers," IEEE Transactions on Circuits and Systems-II: Express Briefs, vol. 63, No. 1, Jan. 2016, 5 pages.
Leo Laughlin: "A tunable frequency division duplex RF front-end based on electrical balance and active self-interference cancellation," EPSRC IAA: Flexible Duplexing for LTE modems (Jul. 2017). 4 pages.

* cited by examiner

ACTIVE INTERFERENCE CANCELLATION APPARATUS, SIGNAL ISOLATION CONTROL APPARATUS AND METHOD OF ACTIVELY CANCELLING INTERFERENCE

This is a National Stage Application under 35 U.S.C. § 371 of International Patent Application No. PCT/EP2018/058214, filed Mar. 29, 2018, which is incorporated herein by reference.

FIELD OF THE INVENTION

The present invention relates to an active interference cancellation apparatus of the type that, for example, comprises an auxiliary transmitter chain to generate a cancellation signal for application to a received signal. The present invention also relates to a signal isolation control apparatus of the type that, for example, comprises a hybrid circuit for duplexing, employed in conjunction with the active interference cancellation apparatus mentioned above. The present invention further relates to a method of actively cancelling interference, the method being of the type that, for example, comprises an auxiliary transmitter chain generating a cancellation signal that is applied to a received signal.

BACKGROUND OF THE INVENTION

In some wireless communications systems, such systems comprise a network infrastructure and user equipment, which can for example be portable communications devices. Such communications devices typically receive and transmit signals through the same antenna or set of antennas. This means that some form of duplexing scheme is required in order to allow the device to separate the incoming and outgoing signals such that the former is not swamped by the latter. In this respect, Time-Division Duplexing (TDD) and Frequency-Division Duplexing (FDD) are both well-known duplexing schemes.

Availability of radio spectrum in which to operate the communications system is known to be a limiting factor. So-called 4G, or Long Term Evolution (LTE), is the successor to existing 2G and 3G communications systems. Indeed, LTE-compliant networks are already in operation in many countries. For historical reasons, there are 60 LTE operating frequency bands for the LTE standard as defined in the 3G Partnership Project (3GPP) Rel 15 of the LTE standard, of which 35 require FDD operation. More bands are likely to be defined in later releases of the LTE standard as further mobile broadband spectrum is made available by governments in various territories.

In FDD radio operation, there are two separate carriers at different frequencies, one for the uplink transmission and one for the downlink transmission. Isolation between the downlink and the uplink transmissions is usually achieved by transmission/reception filters called diplexing filters (duplexers or diplexers). These filters are typically implemented as two highly selective filters, one centred on a receive frequency band, the other centred on the transmit frequency band to separate the transmit and receive signals, thereby preventing the transmit signal from interfering with the receive signal. Acoustic resonator filters, such as Surface Acoustic Wave (SAW) filters, are typically used to provide the low insertion loss and sharp roll-off required of duplexing filters. Although these are individually small and cheap, a communications device that is to support multiple frequency bands requires one diplexing filter per frequency band to be supported and further Radio Frequency (RF) switching for selection between the frequency bands so that the duplexing filters can share the antenna. Other drawbacks are associated with use of the diplexing filters, which drive a search for alternative solutions for the purpose of diplexing.

Many device manufacturers simply circumvent these drawbacks by designing and manufacturing differently configured devices supporting different sets of frequency bands of operation. Manufacturers thus provide a range of devices each of which is operable in different groups of territories with different frequency band combinations. It can therefore be appreciated that obviating the need for the above-described filters would remove a barrier to the manufacture of a "world phone", the benefits of which would provide economies of scale to the mobile telephony industry, and mitigate an inconvenience for the international traveller.

Therefore, there is a significant market demand for a solution that is able to replace the fixed tuned diplexer with a flexible device that can support multiple, preferably all, frequency bands.

Furthermore, by employing a suitable duplexing scheme, which can sufficiently isolate the receiver from the transmitted signal, signals can be simultaneously transmitted and received in a common frequency band, which can provide up to twice as much capacity in the two-way communications link compared to TDD and FDD duplexing schemes.

An alternative duplexing solution employs so-called hybrid junctions or hybrid circuits. This is a 4-port network that can separate the forward and reverse wave directions in a transmission line. Hybrid junctions can be made in a number of ways, including using transformers, waveguides ("magic tees"), or microstrips ("directional couplers"). Hybrid junctions can also be made using active circuits, as is the case for modern electronic analogue wireline phones.

The hybrid junction typically comprises a first (transmit) port, a second (antenna) port, a third (receive) port and a fourth (balance) port. In operation of an ideal hybrid junction, all power incident at the transmit port is divided between the antenna port and the balance port. Likewise, all power incident upon the receive port is divided between the antenna port and the balance port. The device is therefore lossless and reciprocal, and has two symmetry planes with similar properties around each.

A theoretical hybrid junction, when used as a duplexer, has a power amplifier of a transmitter chain coupled to the transmit port thereof and a low-noise amplifier coupled to the receive port. Transmit power applied at the transmit port by the power amplifier is, as described above, divided between the antenna port and the balance port and the low-noise amplifier is isolated, i.e. there is no leakage of a transmit signal into the receiver as long as the reflection coefficients at the antenna port and the balance port are in balance.

In practice, however, use of the hybrid junction as a duplexer also suffers from a number of drawbacks. Firstly, the impedance of the antenna, and so by extension the impedance at the antenna port, typically exhibits variation in both the time domain and frequency domain. The impedance of the antenna can vary with time, for example owing to objects moving in the proximity of the antenna, and consequently, it is necessary to adapt dynamically the impedance at the balance port to the impedance at the antenna port to account for these changes. The antenna impedance also typically varies with frequency and so, to obtain balance at the particular frequency of interest, the impedance at the balance port must be adapted accordingly, and a good balance may be difficult to achieve over a sufficiently wide system bandwidth, for example the 20 MHz needed for an LTE channel. Furthermore, increasing the isolation bandwidth, i.e. the bandwidth over which adequate isolation can be achieved, requires increases in the complexity of the variable balancing impedance circuit, which will increase the size and cost of the device.

Secondly, other coupling mechanisms cause leakage of some of the transmit signal from the transmit port to the receive port of the hybrid junction. As such, isolation of the receive port from the transmit port is limited.

Despite the above-mentioned drawbacks associated with use of the hybrid junction as a duplexer, attempts have been made to obviate or at least mitigate the disadvantages. For example, "Optimum Single Antenna Full Duplex Using Hybrid Junctions" (Laughlin, Beach, Morris and Haine, IEEE Journal of Selected Areas In Communications, Vol. 32, No. 9, September 2014, pages 1653 to 1661), considers an arbitrary antenna with an impedance that can vary widely with frequency and with a return loss that is likely to be of the order of 10 dB minimum (as long as there are no de-tuning proximity effects). This is a practical reality for a transceiver circuit that can be built into a wide range of end products and could possibly be connected through an unknown length of transmission line. So-called Electrical Balance (EB) of the hybrid junction is proposed in the above-referenced document.

International patent publication no. WO2016/128032 discloses a signal isolation apparatus that employs a main transmitter chain and an auxiliary transmitter chain. The main transmitter chain has an output node that is operably coupled to an input node of a hybrid circuit, the hybrid circuit being used for duplex communications. An output node of the hybrid circuit is operably coupled to an input of a receiver chain for receiving, inter alia, RF communications signals received via an antenna operably coupled to an antenna node of the hybrid circuit. The auxiliary transmitter chain comprises an input node operably coupled to a tapped signal terminal in the main transmitter chain and is arranged to tap a main transmission signal propagating through the main transmitter chain as it is being processed ready for transmission as an RF output signal via the antenna. The auxiliary transmitter chain comprises an adaptive filter unit that has coefficients that can be set to modify the tapped main transmission signal before it is processed in a like manner to the main transmission signal by the main transmitter chain. The adapted version of the main transmission signal results in a cancellation signal that is applied to a balance node of the hybrid circuit in order to cancel signal components that are leaking from the input node to the output node of the hybrid circuit in a receive band of the receiver chain.

In this regard, when considering the signals communicated from the main transmitter chain and the auxiliary transmitter chain to the receiver chain, there exist signal coupling mechanisms, for example electrical and electromagnetic coupling, which couple signals from the main transmitter to the receiver, and from the auxiliary transmitter to the receiver. This coupling can be quantified by a self-interference transfer function and a cancellation transfer function respectively, both of which require estimation in order to determine coefficients for the adaptive filter. In order to estimate the self-interference transfer function and the cancellation transfer function, it is known to generate respective pilot signals, each comprising a plurality of subcarriers, the subcarriers being separated in frequency. The pilot signals each comprise the subcarriers of the communications system in which the signal isolation apparatus operates in order to be able to measure the self-interference transfer function and the cancellation transfer function in a comprehensive manner. Furthermore, the respective pilot signals comprise the same carrier signals in order to be able to determine the filter coefficients of the adaptive filter in respect of the same subcarriers. Consequently, in order to measure the pilot signal generated by the transmitter chain using the receiver chain and to measure the pilot signal generated by the auxiliary transmitter chain using the receiver chain, it is necessary to transmit the respective pilot signals separately in time, since the pilot signals each comprise the same subcarriers. To do otherwise will result in the two pilot signals interfering with each other.

It is desirable to optimise operational speed of a communications device employing the above-mentioned active cancellation technique, in particular the configuration of the adaptive filter unit, which currently requires the auxiliary transmitter chain to be inactive while the self-interference transfer function is estimated and vice versa in respect of the cancellation transfer function.

BRIEF SUMMARY OF THE INVENTION

According to a first aspect of the present invention, there is provided an active interference cancellation apparatus for controlling duplex operation of signals to be transmitted and received, the apparatus comprising: a receiver chain comprising a received signal input node; a transmitter chain comprising a transmitter chain tap node and a transmitter output node; an auxiliary transmitter chain having an auxiliary chain input node operably coupled to the transmitter chain tap node, the auxiliary transmitter chain comprising an adaptive filter unit and a cancellation signal output, the cancellation signal output being operably coupled to the received signal input node of the receiver chain; and an interpolation processor; wherein the adaptive filter unit comprises a coefficient processing unit and an adaptive filter, the coefficient processing unit being operably coupled to the receiver chain and the adaptive filter; the interpolation processor is arranged to cooperate with the coefficient processing unit; the transmitter chain is arranged to generate, when in use, a first waveform comprising a first plurality of frequency-separated signals; substantially contemporaneously with the transmitter chain, the auxiliary transmitter chain is arranged to generate a second waveform comprising a second plurality of frequency-separated signals and apply the second waveform at the received signal input node; the receiver chain is arranged to receive a composite waveform comprising a waveform coupled from the output node of the transmitter chain to the received signal input node of the receiver chain and the second waveform from the auxiliary transmitter chain; and the first waveform does not comprise any signals required for determination of equaliser coefficients of the adaptive filter that coincide in frequency with the second plurality of frequency-separated signals of the second waveform.

The waveform coupled from the output node of the transmitter chain to the received signal input node of the receiver chain may be electromagnetically coupled.

The first waveform may correspond to a first plurality of subcarriers and the second waveform may correspond to a second plurality of subcarriers, and the first and second plurality of subcarriers may be different.

The first waveform may be absent of signals required for determination of the equaliser coefficients of the adaptive filter at frequencies occupied by the second plurality of frequency-separated signals of the second waveform.

The second waveform may be absent of signals required for determination of the equaliser coefficients of the adaptive filter at frequencies occupied by the first plurality of frequency-separated signals of the first waveform.

The first plurality of frequency-separated signals and the second plurality of frequency-separated signals may be interleaved in the frequency domain.

The adaptive filter unit may be arranged to estimate coefficients of a frequency domain self-interference transfer function modelling changes undergone by the first waveform in and between the transmitter chain and the receiver chain; the adaptive filter may be arranged to estimate coefficients of a frequency domain cancellation transfer function modelling changes undergone by the second waveform in and between the auxiliary transmitter chain and the receiver chain; and the interpolation processor may be arranged to estimate coefficients of the frequency domain self-interference transfer function in respect of frequencies absent from the first waveform and coefficients of the frequency domain cancellation transfer function in respect of frequencies absent from the second waveform.

The frequencies absent from the first waveform and the frequencies absent from the second waveform may be intentionally absent.

The first waveform may be a spectrally non-contiguous transmit waveform selected from a sequence of transmit waveforms.

The self-interference transfer function may model changes undergone by the first waveform in and between the transmitter chain and the receiver chain, and the cancellation transfer function may model changes undergone by the second waveform in and between the auxiliary transmitter chain and the receiver chain.

The self-interference transfer function may model processing of the first waveform performed by the transmitter chain, the receiver chain and coupling of the first waveform from the transmitter chain to the receiver chain; and the cancellation transfer function may model processing of the second waveform performed by the transmitter chain, the receiver chain and interconnecting circuits.

The interpolation processor may be arranged to estimate the coefficients of the frequency domain self-interference transfer function in respect of frequencies respectively between adjacent frequencies present in the first waveform.

The frequencies respectively between adjacent frequencies present in the first waveform may be frequencies respectively between adjacent frequency-separated signals in the first waveform.

The interpolation processor may be arranged to estimate the coefficients of the frequency domain cancellation transfer function in respect of frequencies respectively between adjacent frequencies present in the second waveform.

The frequencies respectively between adjacent frequencies present in the second waveform may be frequencies respectively between adjacent frequency-separated signals in the second waveform.

The self-interference transfer function may characterise baseband and radio frequency processing stages of the transmitter chain and the receiver chain; and the cancellation transfer function may characterise baseband and radio frequency processing stages of the auxiliary transmitter chain and the receiver chain.

The coefficient processing unit may be arranged to receive the estimated frequency domain self-interference transfer function and the estimated frequency domain cancellation transfer function from the interpolation processor; the coefficient processing unit may be arranged to calculate the equaliser coefficients for the adaptive filter using the estimated frequency domain self-interference transfer function and the estimated frequency domain cancellation transfer function.

The coefficient processing unit may be arranged to calculate filter coefficients of the adaptive filter by negative sign division of the estimated frequency domain self-interference transfer function by the estimated frequency domain cancellation transfer function.

The coefficient processing unit may be arranged to modify, when in use, the coefficients of the adaptive filter with the calculated equaliser filter coefficients.

The equaliser filter coefficients, $\Xi(\omega)$ or $\Xi(k)$, may be calculated using:

$$\Xi(\omega) = \frac{-\Delta(\omega)}{\Theta(\omega)} \text{ or } \Xi(k) = \frac{-\Delta(k)}{\Theta(k)},$$

where $\Delta$ may be the estimated first frequency domain transfer function, $\Theta$ may be the estimated second frequency domain transfer function, $\omega$ may be frequency, and $k$ may be subcarrier number.

The adaptive filter unit may be arranged to modify a tapped transitory signal based on a transmission signal generated in the transmitter chain so that the modified tapped transitory signal when completely processed by the auxiliary transmitter chain may result in a cancellation signal received at the received signal input node of the receiver chain that may cancel the transmission signal coupled from the transmitter output node to the received signal input node.

The auxiliary transmitter chain may comprise the adaptive filter unit and transmitter chain processing stage units; the auxiliary chain input node of the auxiliary transmitter chain may be operably coupled to the adaptive filter unit; the transmitter chain processing stage units may be arranged to complete processing of the tapped transitory signal in accordance with a desired modulation scheme for the transmitter chain.

The adaptive filter configured using the equaliser coefficients may be arranged to modify the tapped transitory signal so that the auxiliary transmitter chain may provide, at the received signal input node of the receiver chain, an antiphase estimate of the received transmission signal coupled from the transmitter output node of the transmitter chain to the received signal input node of the receiver chain.

The cancellation signal may be arranged so as to interfere destructively with the transmission signal coupled to the received signal input node over a frequency range of interest.

According to a second aspect of the present invention, there is provided a signal isolation control apparatus comprising the active interference cancellation apparatus as set forth above in relation to the first aspect of the invention; the apparatus may further comprise: a hybrid circuit comprising an input node, an output node, an antenna node for coupling to an antenna, and a balance node; wherein the received signal input node is operably coupled to the output node of the hybrid circuit; the transmitter chain output node is operably coupled to the input node of the hybrid circuit; and the waveform coupled from the transmitter chain to the receiver chain is leaked by the hybrid circuit from the input node thereof to the output node thereof.

The apparatus may further comprise: a balancing impedance controller that nay have an input operably coupled to an output of the receiver chain; and a variable impedance may have a control input operably coupled to an output of the balancing impedance controller; the variable impedance may also be operably coupled to the balance node of the hybrid circuit.

According to a third aspect of the present invention, there is provided a signal isolation control apparatus comprising the active interference cancellation apparatus as set forth above in relation to the first aspect of the present invention; the apparatus may further comprise: a transmit antenna operably coupled to the transmitter output node; and a receive antenna operably coupled to the receive signal input node.

According to a fourth aspect of the present invention, there is provided a duplexing apparatus comprising the signal isolation control apparatus as set forth above in relation to the second aspect of the invention.

According to a fifth aspect of the present invention, there is provided a wireless transceiver apparatus comprising the interference active cancellation apparatus as set forth above in relation to the first aspect of the invention, the signal isolation control apparatus as set forth above in relation to the second or third aspects of the invention, or the duplexer apparatus as set forth above in relation to the fourth aspect of the invention.

According to a sixth aspect of the present invention, there is provided a communications device comprising the interference active cancellation apparatus as set forth above in relation to the first aspect of the invention, the signal isolation control apparatus as set forth above in relation to the second or third aspects of the invention, the duplexer apparatus as set forth above in relation to the fourth aspect of the invention, or the transceiver apparatus as set forth above in relation to the fifth aspect of the invention.

According to a seventh aspect of the present invention, there is provided a method of actively cancelling interference for duplexed communication of signals, the method comprising: providing a receiver chain; providing a transmitter chain; providing an auxiliary transmitter chain comprising an adaptive filter unit; the transmitter chain transmitting a first waveform comprising a first plurality of frequency-separated signals; the auxiliary transmitter chain substantially contemporaneously generating a second waveform comprising a second plurality of frequency-separated signals; applying the second waveform at an input of the receiver chain; coupling the first waveform from the transmitter chain to the receiver chain; the receiver chain receiving a composite waveform comprising a waveform coupled from the transmitter chain to the receiver chain, and the second waveform from the auxiliary transmitter chain; and the first waveform does not comprise any signals required for determination of equaliser coefficients of the adaptive filter that coincide in frequency with the second plurality of frequency-separated signals of the second waveform.

According to an eighth aspect of the present invention, there is provided a computer program code element arranged to execute the method as set forth above in relation to the seventh aspect of the invention. The computer program code element may be embodied on a computer readable medium.

It is thus possible to provide an apparatus, device and method that is capable of calculating filter coefficients in respect of all or substantially all required frequencies of a communications system in less time than where the waveforms are transmitted serially, without the need to cease transmission of data through the transmitter for the purpose of transmitting a temporally separated waveform through the auxiliary transmitter, and without requiring spectrally contiguous waveforms to be transmitted, which may not be possible under the medium access constraints limiting transmissions from devices in communications networks.

BRIEF DESCRIPTION OF THE DRAWINGS

At least one embodiment of the invention will now be described, by way of example only, with reference to the accompanying drawings, in which.

DETAILED DESCRIPTION OF THE INVENTION

Figure 1:
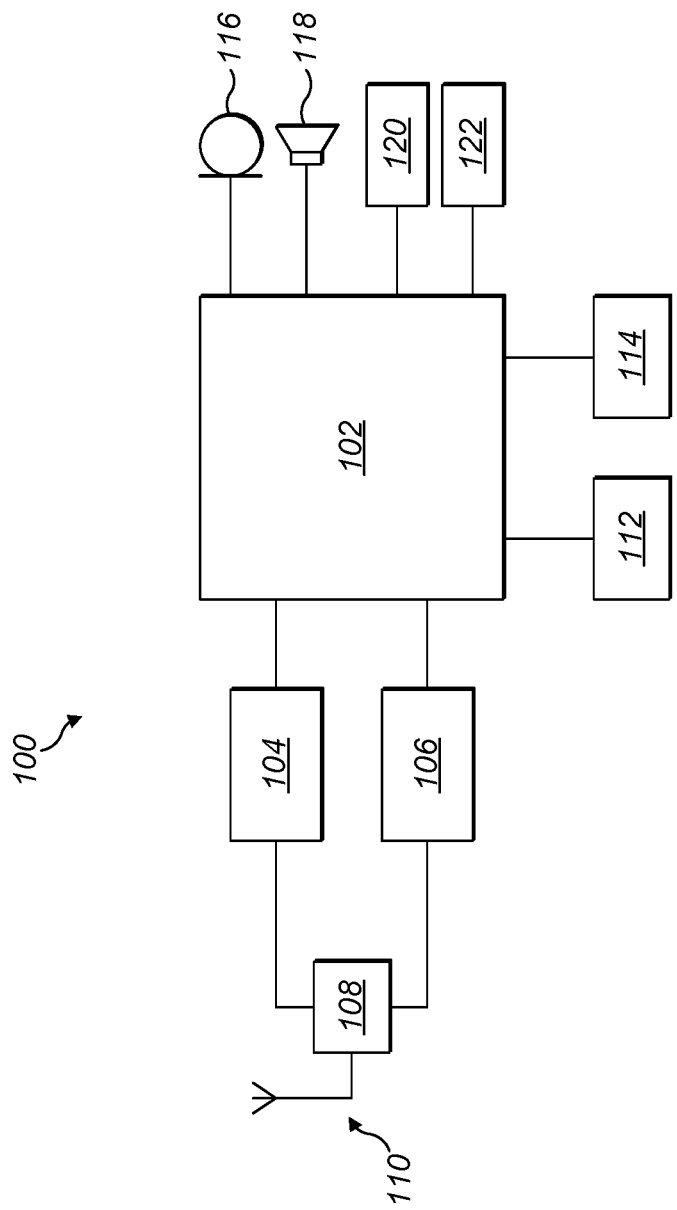
FIG. 1 is a schematic diagram of a communications device comprising a duplexing apparatus constituting an embodiment of the invention.

Throughout the following description, identical reference numerals will be used to identify like parts. References herein to "ports" should be understood also to refer to "nodes" and vice versa.

Referring to FIG. 1, a user equipment (UE) device 100, constituting an example of a communications device, operating in an LTE communications system comprises a processing resource 102, the processing resource 102 being, in this example, a chipset of a cellular communications terminal. The processing resource 102 is coupled to wireless transceiver apparatus comprising a transmitter circuit 104 and a receiver circuit 106, the transmitter and receiver circuits 104, 106 both being coupled to a duplexing apparatus 108. The duplexing apparatus 108 is coupled to an antenna 110.

The UE device 100 also possesses a volatile memory, for example a RAM 112, and a non-volatile memory, for example a ROM 114, each coupled to the processing resource 102. The processing resource 102 is also coupled to a microphone 116, a speaker unit 118, a keypad 120 and a display 122. The skilled person should appreciate that the architecture of the UE device 100 described above comprises other elements, but such additional elements have not been described herein for the sake of preserving conciseness and clarity of description.

Figure 2:
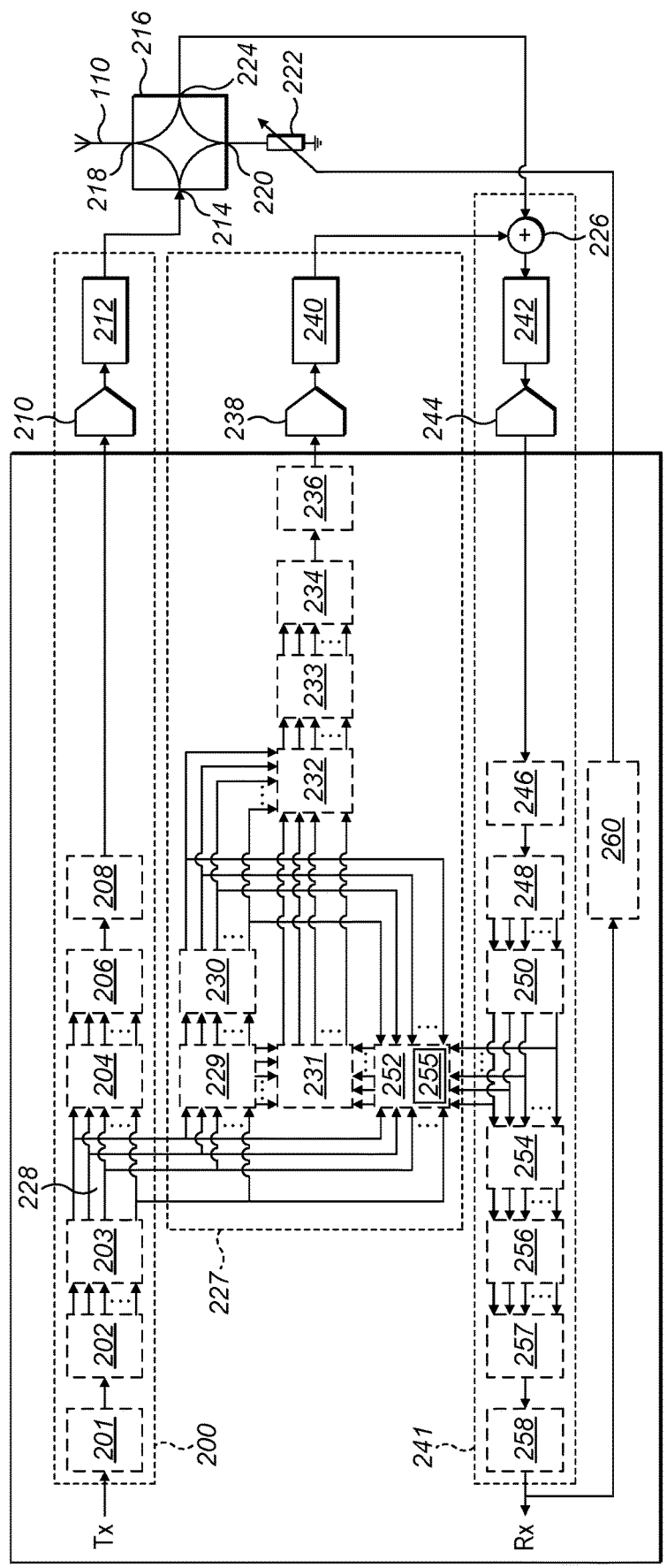
FIG. 2 is a schematic diagram of a transceiver apparatus employing a hybrid circuit and constituting another embodiment of the invention.

Turning to FIG. 2, a signal isolation control apparatus, which can be part of the duplexing apparatus, comprises a main transmitter chain 200 of the transmitter circuit 104 having a modulator unit 201 operably coupled to a serial-to-parallel converter unit 202. The serial-to-parallel converter unit 202 comprises a plurality of outputs for providing a first parallel output signal, the plurality of outputs being operably coupled to a plurality of inputs of a subcarrier mapper unit 203. The subcarrier mapper 203 comprises a plurality of outputs for providing a second parallel output signal, the second parallel output signal being a mapping of the parallel signal at the input thereof, which maps input symbols to subcarrier frequencies according to, for example, a medium access control scheme. The subcarrier mapper 203 can have a larger number of parallel outputs than parallel inputs, with unmapped parallel output signals being set to zero such that signals at particular subcarrier frequencies are absent, thereby facilitating transmission of spectrally non-contiguous waveforms, as can be required by a medium access control scheme. The parallel output of the subcarrier mapper unit 203 is operably coupled to a first Inverse Fast Fourier Transfer (IFFT) unit 204 having a plurality of outputs operably and respectively coupled to a corresponding plurality of inputs of a first parallel-to serial converter unit 206, an output of the first parallel-to-serial converter unit 206 being operably coupled to a first cyclic prefix addition unit 208.

An output of the first cyclic prefix addition unit 208 is operably coupled to a first Digital-to-Analogue Converter (DAC) unit 210, the first DAC unit 210 being operably coupled to a main transmitter radio unit 212. An output node of the main transmitter radio unit 212, constituting a transmitter output node, is operably coupled to an input node 214 of a hybrid circuit 216. An antenna node 218 of the hybrid circuit 216 is operably coupled to the antenna 110. A balancing node 220 of the hybrid circuit 216 is operably coupled to a variable impedance 222, and an output node 224 of the hybrid circuit 216 is operably coupled to a received signal input node, which in this example is a signal summation unit 226 having a first input and a second input, the first input being operably coupled to the output node 224 of the hybrid circuit 216.

A notional tapping point 228 is provided between the subcarrier mapper unit 203 and the first IFFT unit 204 in order to provide input signals to an auxiliary transmitter chain 227 of the transmitter circuit 104, the auxiliary transmitter chain 227 comprising transmitter chain processing stage units. As such, the plurality of outputs of the subcarrier mapper unit 203 is also operably coupled to a plurality of inputs of a first switching unit 229, a first plurality of outputs of the first switching unit 229 being operably coupled to a plurality of inputs of a second waveform generator 230. The plurality of outputs of the subcarrier mapper unit 203 is also operably coupled to a coefficient processor 252. A second plurality of outputs of the first switching unit 229 is operably coupled to a first plurality of inputs of an adaptive filter unit 231, for example a Frequency Domain Equaliser (FDE) having a plurality of outputs operably coupled to a first plurality of inputs of a second switching unit 232. A plurality of outputs of the second waveform generator 230 is coupled to a second plurality of inputs of the second switching unit 232. The plurality of outputs of the second waveform generator 230 is also coupled to the coefficient processor 252. A plurality of outputs of the second switching unit 232 is coupled to a plurality of inputs of a second IFFT unit 233. A plurality of outputs of the second IFFT unit 233 is operably coupled to a plurality of inputs of a second parallel-to-serial converter unit 234, the second parallel-to-serial converter unit 234 being operably coupled to a second cyclic prefix addition unit 236. An output of the second cyclic prefix addition unit 236 is operably coupled to a second DAC unit 238, the second DAC unit 238 being operably coupled to an auxiliary transmitter radio unit 240. An output node of the auxiliary transmitter radio unit 240 is operably coupled to the second input, mentioned above, of the receive signal input node. One or more of the second IFFT unit 233, the second parallel-to-serial converter unit 234, the second cyclic prefix addition unit 236, the second DAC unit 238 and/or the auxiliary transmitter radio unit 240 constitute auxiliary transmitter chain processing stage units arranged to complete processing of waveforms in accordance with a desired modulation scheme, which in this example is the modulation scheme supported by the main transmitter chain 200. Of course, the auxiliary transmitter chain 227 of this example has been described in a simplified manner for the sake of conciseness of description and the skilled person will appreciate that the transmitter chain processing stage units can comprise other functional processing stages that support the generation of transmission signals present in the main transmitter chain 200

A receiver chain 241 of the receiver circuit 106 comprises the receive signal input node, the receive signal input node being operably coupled to an input of a receiver radio unit 242. An output of the receiver radio unit 242 is operably coupled to an input of an Analogue-to-Digital Converter (ADC) unit 244, an output of the ADC unit 244 being operably coupled to an input of a cyclic prefix removal unit 246. An output of the cyclic prefix removal unit 246 is operably coupled to an input of a second serial-to-parallel converter unit 248 having a plurality of outputs respectively operably coupled to a plurality of inputs of a Fast Fourier Transform (FFT) unit 250. A plurality of outputs of the FFT unit 250 is operably coupled respectively to a first plurality of inputs of an FDE coefficient processor 252 and respectively to a plurality of inputs of a radio channel FDE unit 254. The FDE coefficient processor 252 comprises an interpolation processor 255. However, the skilled person will appreciate that the interpolation processor 255 could be arranged with respect to the FDE coefficient processor 252 in other ways, according to implementation convenience. For example, the interpolation processor 255 can be operably coupled to the FDE coefficient processor 252. A plurality of outputs of the FDE coefficient processor 252 is operably coupled respectively to a second plurality of inputs of the adaptive filter unit 231. A second plurality of inputs of the FDE coefficient processor 252 is operably coupled to the second plurality of outputs of the first switching unit 229.

A plurality of outputs of the radio channel FDE unit 254 is operably coupled respectively to a subcarrier demapper 256, and a plurality of outputs form the subcarrier demapper 256 is operably coupled to a third parallel-to-serial converter unit 257, an output of the third parallel-to-serial converter unit 256 being operably coupled to a demodulator unit 258. An output of the demodulator unit 258 is operably coupled to an input of a balancing impedance control unit 260, a control output of the balancing impedance control unit 260 being operably coupled to a control input of the variable impedance 222.

It should be appreciated that in this example (and subsequent examples) the main transmitter 200 chain, the auxiliary transmitter chain 227 and the receiver chain 241, together, constitute an active interference cancellation apparatus.

Figure 3:
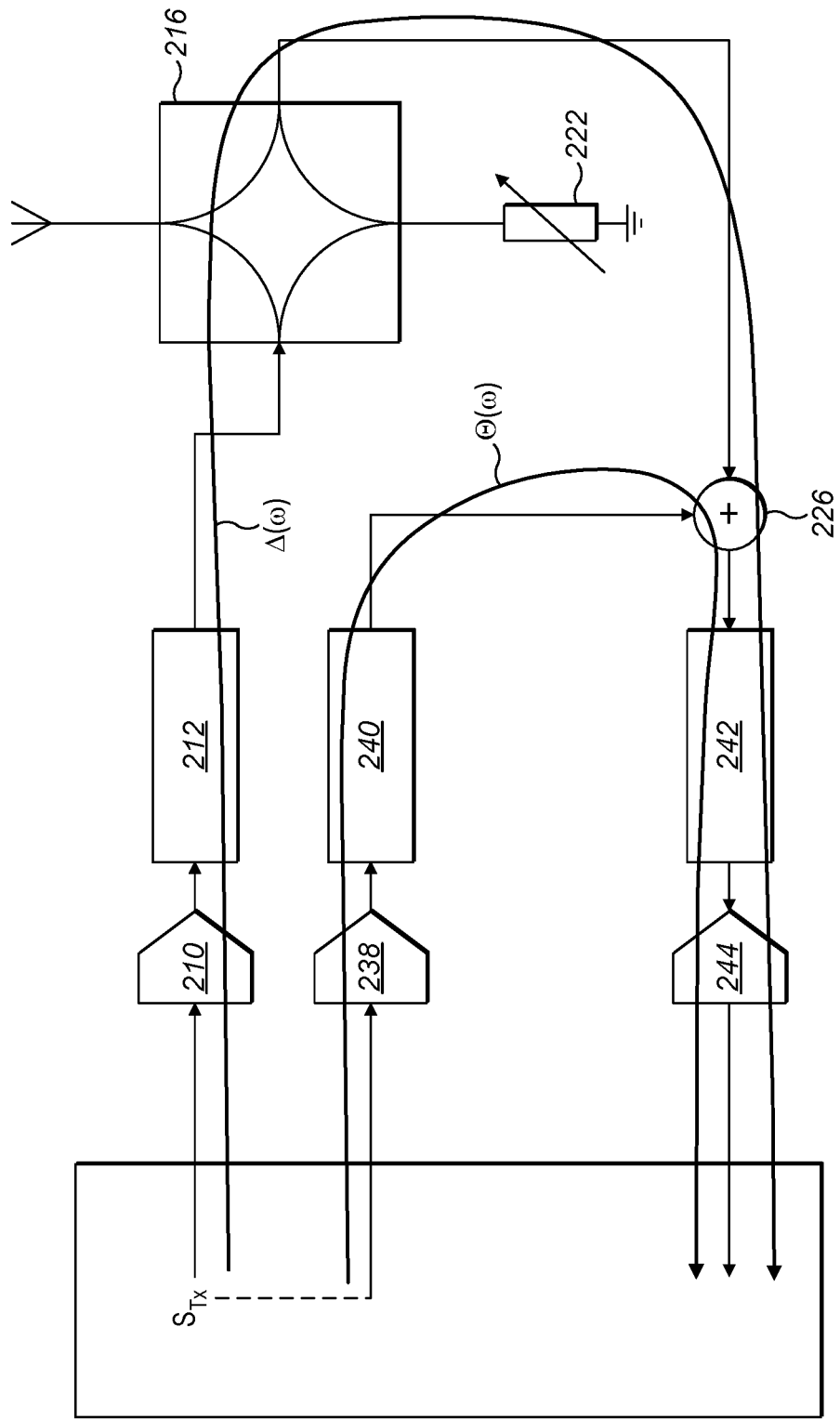
FIG. 3 is a schematic diagram of transfer functions of the apparatus of FIG. 2.

Referring to FIG. 3, a self-interference transfer function, for example a frequency domain self-interference transfer function, $\Delta(\omega)$, can be employed to model the amplitude and phase changes experienced by waveforms following a path through and between the main transmitter chain 200, the hybrid circuit 216 and the receiver chain 241. Similarly, a cancellation transfer function, for example a frequency domain cancellation transfer function, $\Theta(\omega)$, can be employed to model the amplitude and phase changes experienced by waveforms following a path through and between the auxiliary transmitter chain 227 and the receiver chain 241.

By quantifying the self-interference transfer function and the cancellation transfer function, it is possible to determine an equaliser function, ≡(ω), which can be implemented by the adaptive filter 231 in order to achieve cancellation of waveform components coupled, for example, electromagnetically coupled, from, for example, the input node to the output node of the hybrid circuit 216.

In this regard, if the self-interference transfer function and the cancellation transfer function are estimated, it is possible to use the following expression for cancellation of the coupled waveform components in respect of a transmission waveform, $S_{TX}$, formed in the main transmitter chain 200:

$$0 = S_{TX}(\omega)\Delta(\omega) + \alpha(\omega)S_{TX}(\omega)\Theta(\omega) \qquad (1)$$

This equation can be solved (by rearranging) to yield the following expression:

$$\equiv(\omega) = \frac{-\Delta(\omega)}{\Theta(\omega)} \qquad (2)$$

If the self-interference transfer function, $\Delta(\omega)$, and the cancellation transfer function, $\Theta(\omega)$, are known, the equaliser function, ≡(ω), can be calculated.

In another example (FIG. 4), the signal isolation control apparatus of FIG. 2 does not employ the hybrid circuit 216, but instead the active interference cancellation apparatus is supplemented with a first antenna 270 operably coupled to the output node of the main transmitter radio unit 212 and a second antenna 272 operably coupled to the first input of the signal summation unit 226, which constitutes the receive signal input node.

Figure 5:
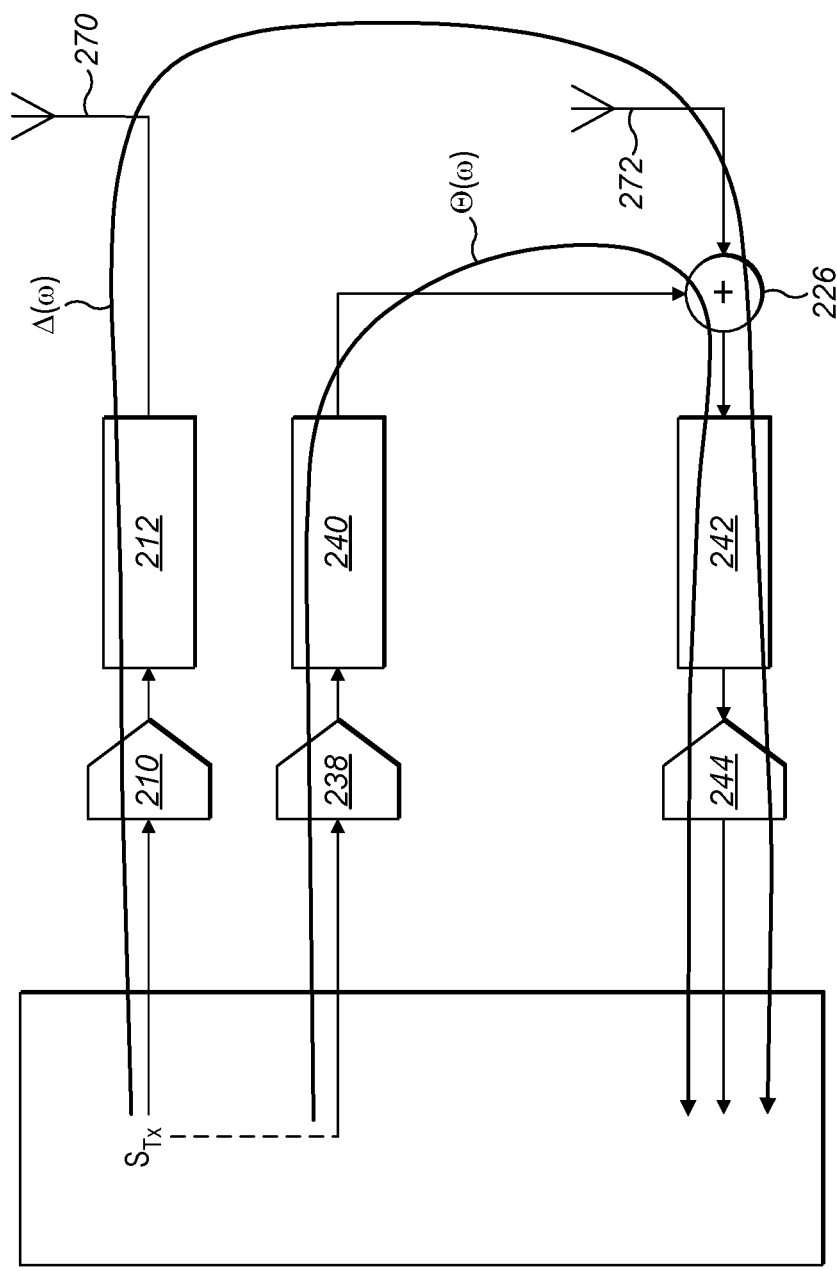
FIG. 5 is a schematic diagram of transfer functions of the apparatus of FIG. 4.

In this example, and referring to FIG. 5, the self-interference transfer function, $\Delta(\omega)$, can be employed to model the amplitude and phase changes experienced by waveforms following a path through the main transmitter chain 200, propagating from the first antenna 270 to the second antenna 272, and the receiver chain 241. In this respect, the self-interference transfer function can also characterise baseband and radio-frequency processing stages of the main transmitter chain and the receiver chain. Similarly, as previously described, the cancellation, transfer function, $\Theta(\omega)$, can be employed to model amplitude and phase changes experienced by waveforms following the path through the auxiliary transmitter chain 227, the receiver chain 241 and interconnecting circuitry. In this respect, the cancellation transfer function can also characterise baseband and radio-frequency processing stages of the auxiliary transmitter chain and the receiver chain.

The above expression (equation (1)) therefore applies for cancelling the waveform coupled from the first antenna 270 to the second antenna 272. As such, equation (2) can be employed to calculate the equaliser function, ≡(ω), for application by the adaptive filter unit 231 of the apparatus of FIG. 4.

Figure 6:
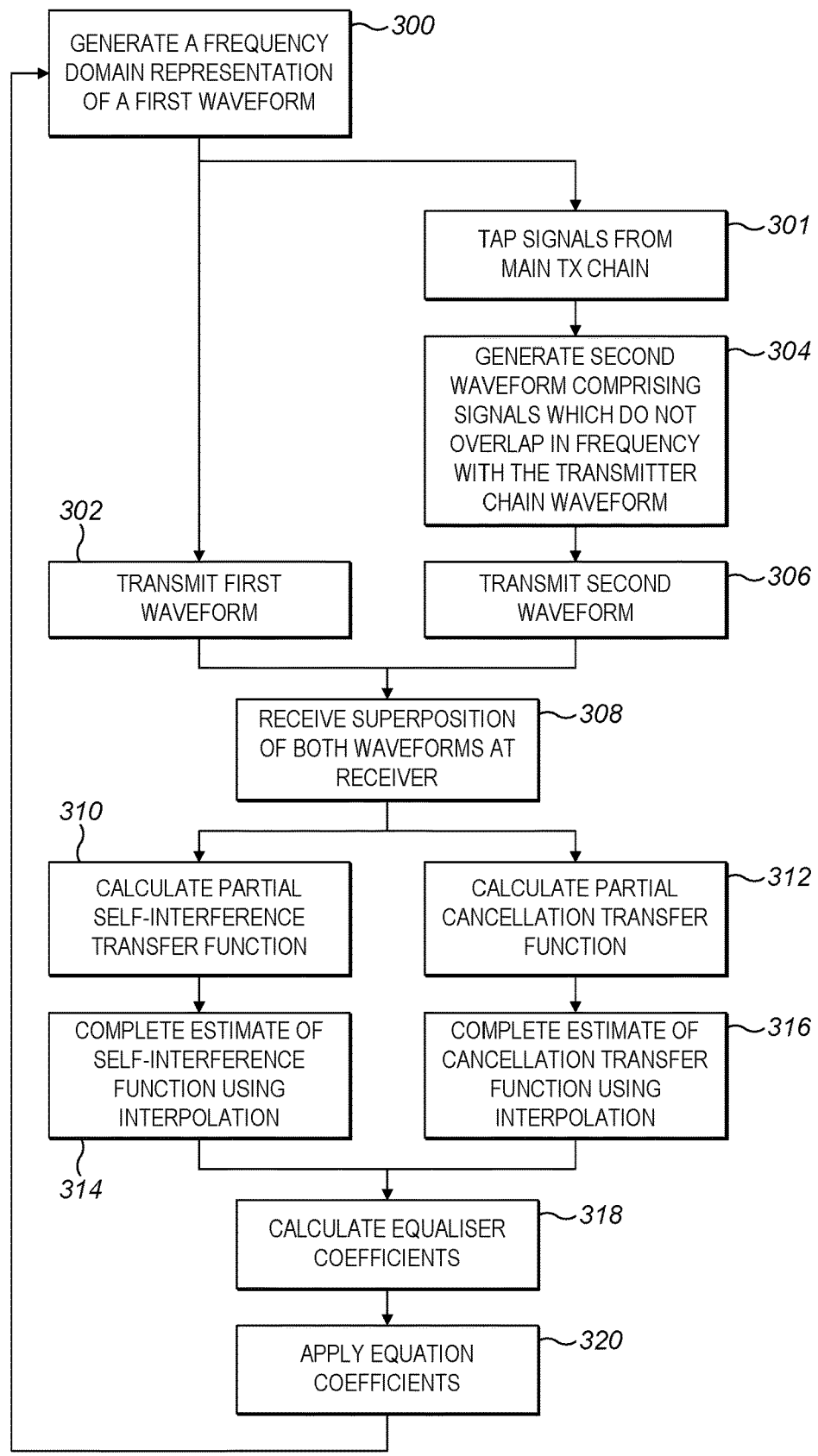
FIG. 6 is a flow diagram of a method of determining filter coefficients constituting yet another embodiment of the invention.

In operation (FIGS. 6 and 7), when the active interference cancellation apparatus needs to determine the coefficients of the adaptive filter 231, the first switching unit 229 is instructed to couple the notional tapping point 228, for example the plurality of outputs of the serial-to-parallel convertor unit 202 to the plurality of inputs of the second waveform generator 230. The second switching unit 232 is instructed to couple the plurality of outputs of the second waveform generator 230 to the plurality of inputs of the second IFFT unit 233. Thereafter, the main transmitter chain 200 by way of the modulator unit 201, generates a first modulated signal, which is output to the serial-to-parallel converter 202. The first modulated signal is output in parallel from the serial-to-parallel converter 202 to the subcarrier mapper 203, which maps the modulation symbols to subcarrier frequencies in order to generate (Step 300) a frequency domain representation of a first waveform 400 (FIG. 7) comprising a plurality of frequency-separated signals 402 at a respective plurality of frequency points 403. In this example, the first waveform 400, generated from the first modulated signal and corresponding subcarrier mapping is generated solely for the purpose of calculating the equaliser coefficients for the adaptive filter unit 231. However, in other embodiments, a waveform generated for the purpose of transmitting data, i.e. generated from a signal modulated according to payload data and with subcarrier mapping performed according to a medium access control scheme, can be used instead. The first waveform 400, in parallel format, continues to be processed by the processing stages of the main transmitter chain 200, including the application of an inverse Fourier transform by the first IFFT unit 204 on the different signals of the first waveform 400, followed by conversion back to a serial format by the first serial-to-parallel converter unit 206 and the addition of, in this example, a cyclic prefix by the cyclic prefix addition unit 208 in readiness for transmission. In this regard, the first waveform 400 is then converted to the analogue domain by the first ADC 210 before being upconverted and amplified by the transmit radio unit 212 prior to, in respect of the example of FIG. 2, application to the input node 214 of the hybrid circuit 216. A proportion of the energy of the first waveform 400 is coupled to the antenna 110 and irradiated as a transmission signal (Step 302). However, a portion of the energy of the first waveform 400 is coupled undesirably to the output node of the hybrid circuit 216. Under normal circumstances, this coupled waveform based upon the first waveform 400 would constitute an interfering signal, which would interfere with signals legitimately received by the antenna 110 and coupled to the output terminal 224 of the hybrid circuit 216 for processing by the receiver chain 241.

Figure 4:
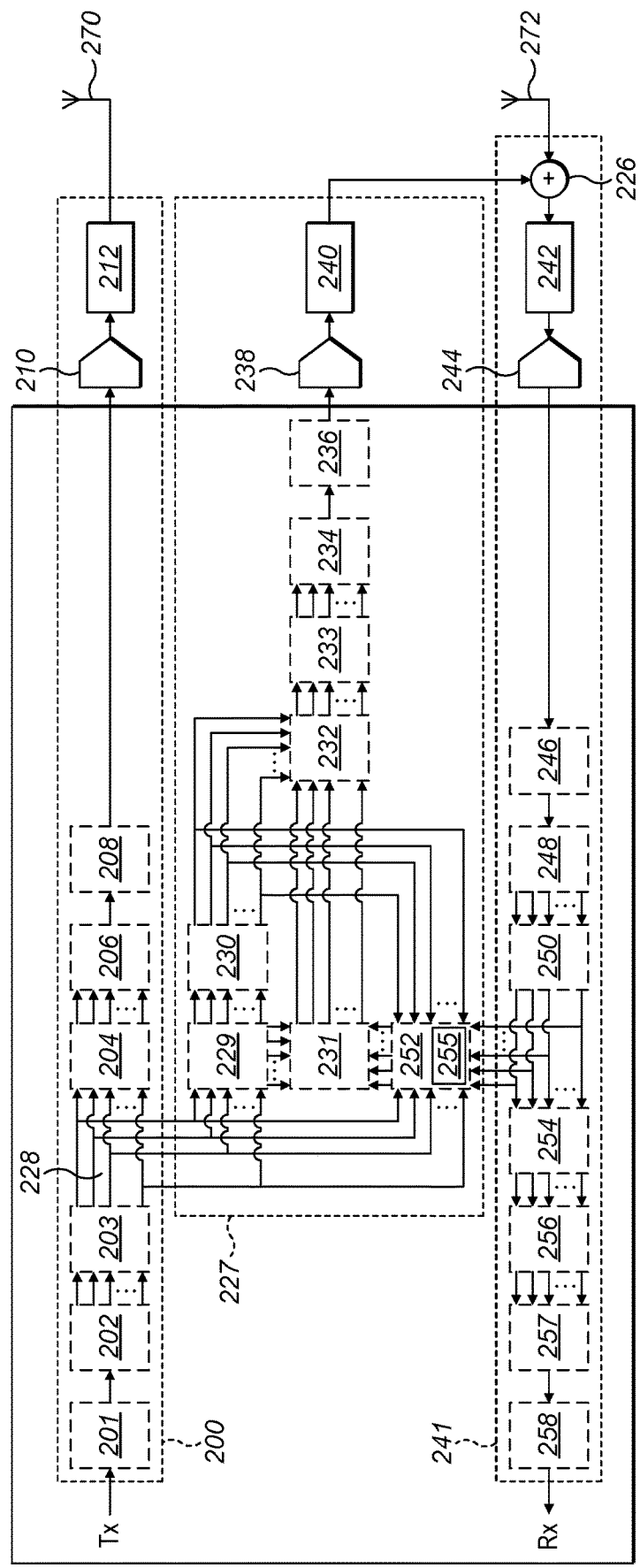
FIG. 4 is a schematic diagram of another transceiver apparatus employing separate transmit and receive antennas and constituting a further embodiment of the invention.

Of course, in the context of the example of FIG. 4, the hybrid circuit 216 is not employed and, instead, the energy of the first waveform 400 is coupled to the first antenna 270 for irradiation as the transmission signal mentioned above. However, a portion of the energy of the transmission signal is undesirably received by, or coupled to, the second antenna 272. Under normal circumstances, this coupled waveform based upon the first waveform 400 would constitute the interfering signal, which would interfere with wanted receive signals received by the second antenna 272.

However, in this example, the modulator 201, serial-to-parallel converter 202 and sub-carrier mapper 203 are appropriately programmed to generate the first waveform 400 so as to comprise signals at the alternate frequency points 403. As such, the first waveform 400 comprises the first plurality of frequency-separated signals 402 disposed about the first plurality of frequency points 403, the first plurality of frequency points 403 being separated by alternate frequency points 404 absent of corresponding signals.

In the auxiliary transmitter chain 227, the second waveform generator 230 receives (Step 301) the first waveform 400 generated by the first waveform generator 201 via the first switching unit 229. The second waveform generator 230 then analyses the first waveform 400 in order to determine the frequency points in the first waveform 400 that are unpopulated by signals, i.e. the first plurality of alternate frequency points 404 of the first waveform 400 absent of the corresponding signal mentioned above. The second waveform generator 230 (FIG. 2) then generates (Step 304) the second waveform 406 so as to comprise a second plurality of frequency-separated signals 408 located about a second respective plurality of frequency points 410 corresponding to the first plurality of alternate frequency points 404, which is unpopulated. Alternate frequency points 412 of the second waveform 406 are absent of signals, which are present at the first plurality of frequency points 403 in the first waveform 400. Thereafter, as in respect of the main transmitter chain 200, the parallel signals representing frequency-separated signals of the second waveform 406 are converted from the parallel format to the serial format by the second parallel-to-serial converter 234 before a cyclic prefix is added to the serial second waveform, which comprises a plurality of frequency-separated signals.

In this example, the second waveform 406 is generated so that the alternate frequency points of the second waveform 406 at which signals are disposed are different to the frequency points of the first waveform 400 at which signals are disposed for transmission. The second waveform 406 is therefore transmitted (Step 306) from the output of the auxiliary transmitter chain 227. As such, at the output node of the first transmit radio unit 212, for determining coefficients of the adaptive filter 231, the first waveform 400 does not comprise any signals that coincide in frequency with the second waveform 406.

In this example, the first waveform 400 is absent, for example intentionally absent, of signals required for determination of the equaliser coefficients of the adaptive filter 231 at frequencies occupied by the second plurality of frequency-separated signals 408 of the second waveform 406. In this regard, the second waveform 406 is absent, for example intentionally absent, of signals required for determination of the equaliser coefficients of the adaptive filter 231 at frequencies occupied by the first plurality of frequency-separated signals 402 of the first waveform 400. For example, the first plurality of frequency-separated signals 402 and the second plurality of frequency-separated signals 408 are interleaved in the frequency domain. It should be appreciated that such interleaving does not necessarily have to be alternate and regular.

In this regard, and in another embodiment, the first waveform 400 is a waveform generated for the purposes of transmitting data according to payload data and signalling, and medium access control protocols of the communications network. In this example, the waveform 400 is selected from a sequence of transmitted waveforms serially transmitted from a communications device in normal operation, such that the selected waveform 400 is a spectrally non-contiguous waveform, in which signals are absent at frequency points. This can be achieved by selecting a waveform containing signalling or reference signals that can be periodically sent from the UE device 100 during normal operation. For example, in the LTE communications system, this can be achieved using transmission waveforms containing, for example, a Sounding Reference Signal (SRS). The bandwidth and spacing of the signals in the first waveform 400 is determined by the transmission signals present in the selected transmission waveform. The bandwidth and spacing of the signals in the selected waveform can be determined by the subcarrier mapping applied by the subcarrier mapper 203 according to, for example, the multiple access control protocols, or frequency domain scheduling protocols, and/or signalling protocols, during operation in the communications network. As such, the interleaving of the first and second waveforms 400, 406 are unlikely to follow a regular pattern of repetition in the frequency domain. Nevertheless, those skilled in the art will recognise that, in this case, the superposition waveform 414 can still be separated as described above to enable estimation of a partial self-interference transfer function estimate, albeit with a first plurality of frequency points that do not occur at a respective consistent frequency spacing, and a partial cancellation transfer-function estimate, albeit with a second plurality of frequency points that do not occur at a respective consistent frequency spacing. The skilled person will also recognise that appropriate interpolation techniques 314, 316 can be applied to the partial estimate of the self-interference transfer function 416 regardless of the frequency values of the first plurality of frequency points 403, and that appropriate interpolation techniques can be applied to the partial estimate of the cancellation transfer function 418 regardless of the frequency values of the second plurality of frequency points 410.

In any event, in relation to either embodiment, at the receive signal input node, the first waveform 400 and the second waveform 406 are received (Step 308) and a superposition 414 of both the first and second waveforms 400, 406, constituting a composite waveform, is output at the output of the receive signal input node. The superposition of waveforms 414 is then processed by the receiver chain 241. In this respect, the receiver radio unit 242 down-converts the superposition of waveforms 414 to baseband and the received baseband signal is converted to the digital domain by the ADC unit 244. Thereafter, the cyclic prefix removal unit 246 removes the cyclic prefix from the digital signal output by the ADC unit 244. The second serial-to-parallel converter unit 248 then converts the digital signal stripped of the cyclic prefix into a plurality of parallel digital received signal, each output corresponding to a frequency of a signal of the superposition waveform 414 (derived from the first and second waveforms 400, 406).

The signals at the plurality of outputs of the serial-to-parallel converter unit 248 are respectively applied to the plurality of inputs of the FFT unit 250, which performs a Fourier transform on the plurality of signals of the superposition waveform 414 in order to convert the signals from time domain to the frequency domain. The output of the FFT unit 250 is received by the coefficient processor unit 252, which analyses the plurality of signals of the first and second waveforms 400, 406.

Figure 7:
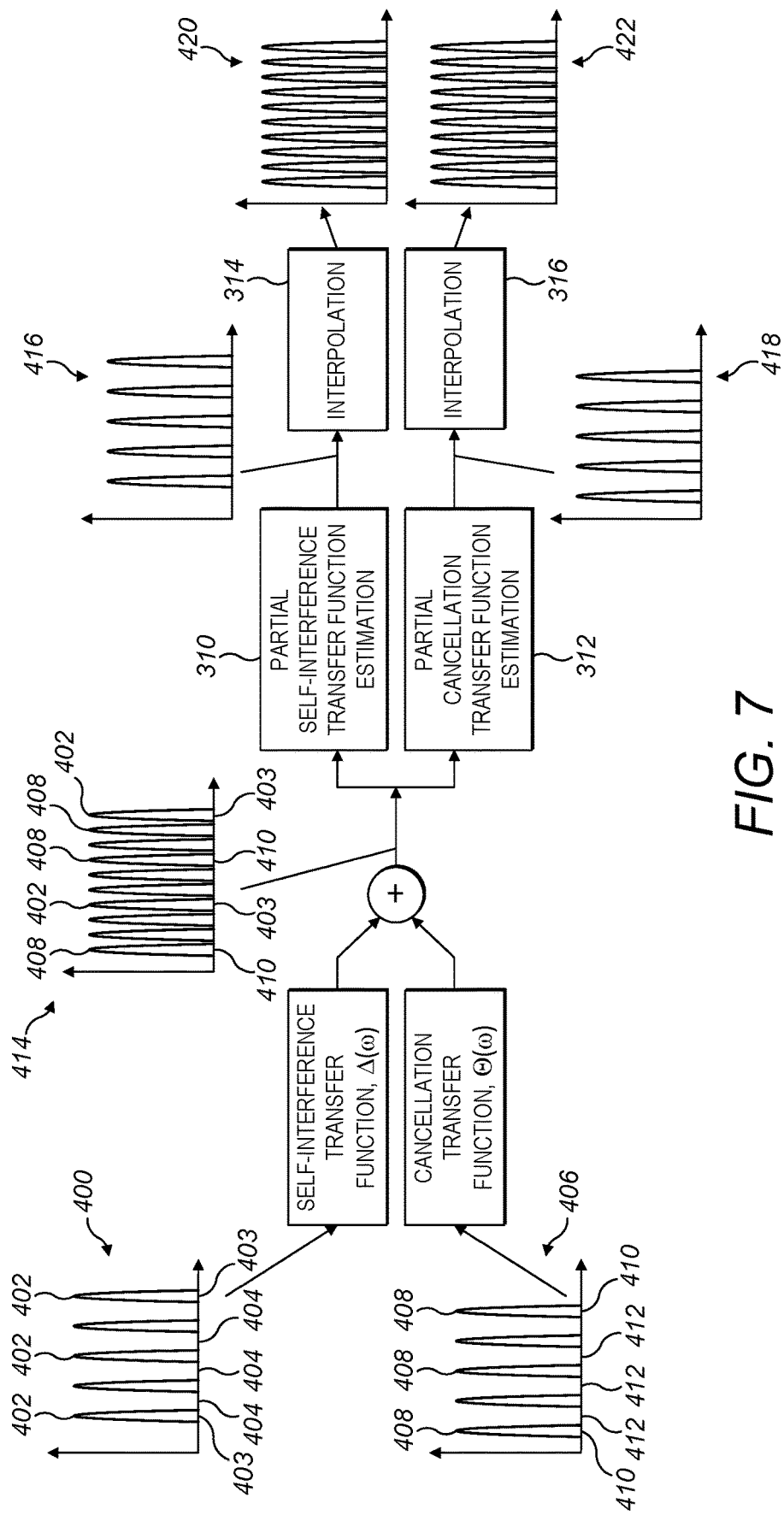
FIG. 7 is a schematic diagram of waveforms generated and processed in accordance with the method of FIG. 6.
Figure 8:
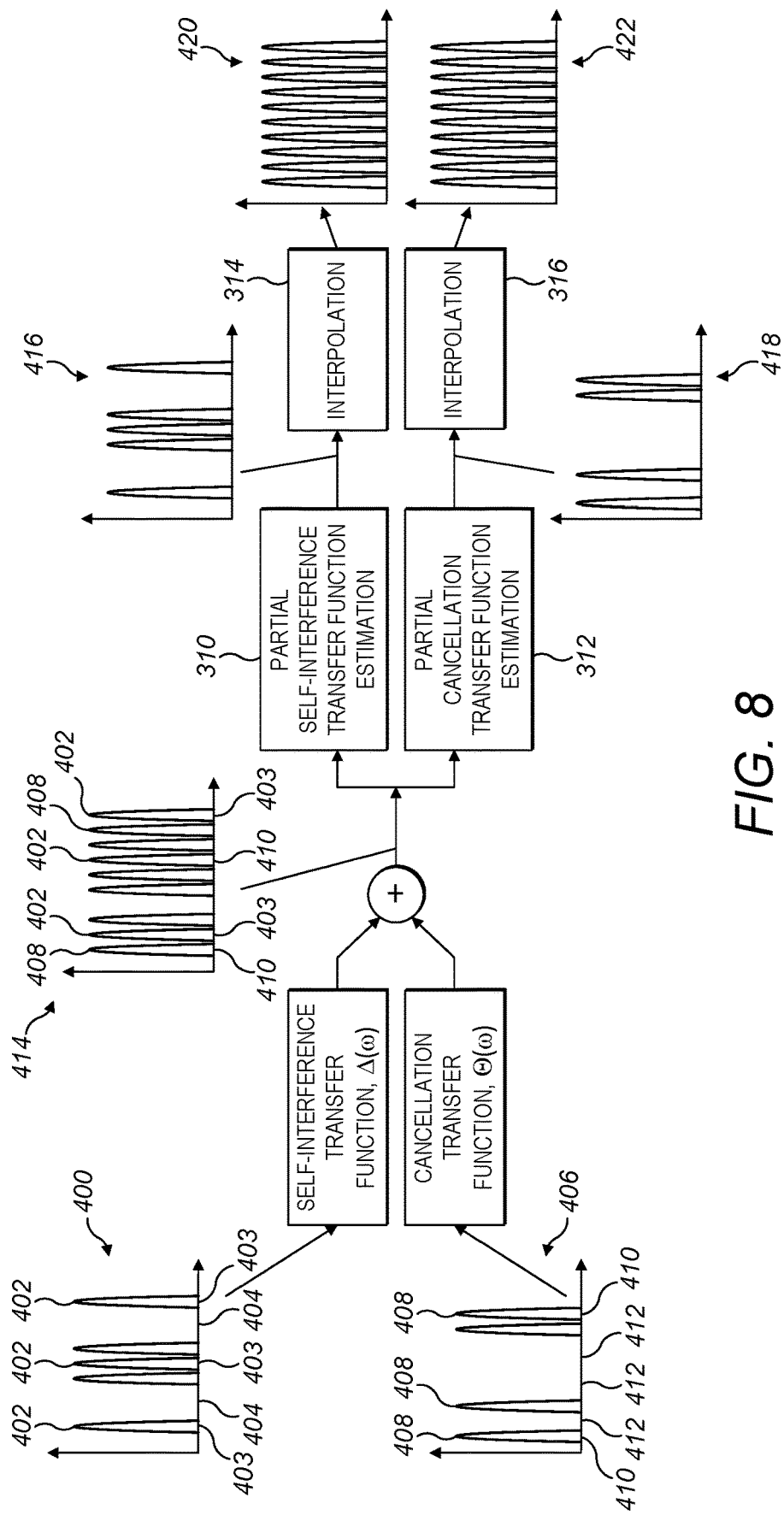
FIG. 8 is a schematic diagram of waveforms generated and processed that are different to those of FIG. 7 and constituting a further embodiment of the invention.

In particular, the coefficient processor unit 252, observes the transmitted waveforms 400, 406 at the inputs thereof and as provided by the outputs of the subcarrier mapper 203 and waveform generator 230 respectively to determine the first plurality of frequency points 403 and second plurality of frequency points 410. The coefficient processor unit 252 then uses the knowledge that the first plurality of frequency-separated signals 402 of the first waveform 400 is disposed at the first plurality of frequency points 403 of the superposition waveform 414 and the second plurality of frequency-separated signals 408 of the second waveform 406 is disposed at the second plurality of frequency points 410 of the superposition waveform 414, to select or extract, depending upon implementation preferences, the first plurality of frequency-separated signals 402 and the second plurality of frequency-separated signals 408 by selecting a first set of alternate frequency points and a second set of alternate frequency points, where the second set of alternate frequency points are interleaved with the first set of alternate frequency points. Using the first plurality of frequency-separated signals 402 received as part of the superposition waveform 414 in respect of the coupled first waveform 400, and the first plurality of test signals 402 as transmitted in the first waveform 400, the coefficient processor unit 252 generates (Step 310) a partial estimate of the self-interference transfer function 416, and, likewise, using the second plurality of frequency-separated signals 408 as received in the superposition waveform 414, and the second plurality of test signals 408 as transmitted in the second waveform 406, the coefficient processor unit 252 generates (Step 312) a partial estimate of the cancellation transfer function 418. The estimates are partial, because the respective first and second pluralities of signals 402, 408 coupled to the receive signal input node are respectively absent of signals at alternate frequency points. In respect of the partial estimate of the self-interference transfer function 416, the estimate lacks alternate coefficients between estimated coefficients. The interpolation processor therefore calculates (Step 314), for example estimates, the coefficients absent from the partial estimate of the self-interference transfer function, in this example by interpolation, for example coefficients corresponding to frequencies respectively between adjacent frequencies present in the first waveform. In this regard, this can be in respect of frequencies respectively between adjacent frequency-separated signals in the first waveform. In this manner a complete estimate 420 of the self-interference transfer function is obtained (FIG. 7). Similarly, in respect of the partial estimate of the cancellation transfer function 418, the estimate lacks alternate coefficients between estimated coefficients. The interpolation processor therefore calculates (Step 316), for example estimates, the coefficients absent from the partial estimate of the cancellation transfer function, in this example by interpolation, for example coefficients corresponding to frequencies present in the second waveform. In this regard, this can be in respect of frequencies respectively between adjacent frequency-separated signals in the second waveform. In this manner a complete estimate 422 of the cancellation transfer function is obtained (FIG. 7).

Following generation of complete estimates of the self-interference transfer function 420 and the cancellation transfer function 422, with the assistance of the interpolation processor 252, the completed estimates 420, 422 are communicated to the coefficient processor 252, which employs equation (2) above to calculate (Step 318) the coefficients of the adaptive filter 231, which, in this example is a negative sign division of the first frequency domain transfer function by the second frequency domain transfer function. The calculated coefficients are then applied (Step 320) to adaptive filter 231, thereby setting the adaptive filter 231 so as to "shape" the cancellation signal generated by the auxiliary transmitter chain 227 so that, at the receive signal input node, the cancellation signal cancels unwanted signal components present in the transmission signal as received at the receive signal input node, for example as a result of leakage of the first waveform from the input node 214 to the output node 224 of the hybrid circuit 216.

Following completion of initial programming of the adaptive filter 231, the first switching unit 229 is instructed to couple the notional tapping point 228, for example the plurality of outputs of the first serial-to-parallel converter unit 202, to the first plurality of inputs of the adaptive filter unit 231 and the second plurality of inputs of the coefficient processor 252. The second switching unit 232 is also instructed to couple the plurality of outputs of the adaptive filter unit 231 to the plurality of inputs of the second IFFT unit 233.

Thereafter, the active interference cancellation apparatus generates waveforms in the main transmitter chain 200 for communication of transmission data and the auxiliary transmitter chain 227 generates the cancellation signal to remove unwanted signal components present in a received signal received via the antenna and receiver chain 241 and decodes the received signal in accordance with any suitable technique, for example in accordance with a wireless communications standard, for example LTE.

In this regard, a transitory signal in the main transmitter chain 200 relating to the generated waveforms for communication of transmission data is tapped off into the auxiliary transmitter chain 227 via the notional tapping point 228 and is modified by the adaptive filter 231 applying the calculated equaliser coefficients determined above. The auxiliary transmitter chain 227 completely processes the modified tapped transitory signal to yield the cancellation signal at the received signal input node, which cancels the transmission signal as coupled from the transmitter output node (the output of the main transmitter radio unit 212 in this example) to the received signal input node. The cancellation signal is an antiphase estimate of the received transmission signal at the received signal input node. In this example, the cancellation signal therefore interferes destructively with the transmission signal as coupled to the received signal input node.

In another example, advantage can be taken of a simplification to the mathematics achieved by employing a common waveform, for example a common pilot waveform for both the first waveform and the second waveform 400, 406. In this regard, the self-interference transfer function, $\Delta(\omega)$, can be given by:

$$\Delta(\omega) = \frac{S_{RxTx}(\omega)}{S_{P1}(\omega)} \qquad (3)$$

where $S_{RxTx}(\omega)$ is the signal generated at the output of the receiver chain 241 in respect of the first waveform 400, and $S_{P1}$ is a first pilot signal constituting the first waveform 400 and comprising a first plurality of subcarriers. Equation (3) above assumes that the auxiliary transmitter chain 227 is not transmitting the second waveform 406.

The cancellation transfer function, $\Theta(\omega)$, is calculated in a similar manner. In this respect, the cancellation transfer function, $\Theta(\omega)$, can be given by the following expression:

$$\Theta(\omega) = \frac{S_{RxCx}(\omega)}{S_{P2}(\omega)} \qquad (4)$$

where $S_{RxTx}(\omega)$ is the signal generated at the output of the receiver chain 241 in respect of the second waveform 406, and $S_{P2}$ is a second pilot signal constituting the second waveform 406 and comprising a second plurality of subcarriers. Equation (3) above assumes that the main transmitter chain 200 is not transmitting the first waveform 400.

Substituting equations (3) and (4) into equation (2) derived previously yields:

$$\equiv (\omega) = \frac{-\Delta(\omega)}{\Theta(\omega)} = \frac{S_{RxTx}(\omega)/S_{P1}(\omega)}{S_{RxCx}(\omega)/S_{P2}(\omega)} \qquad (5)$$

If, however, a common pilot, $S_P(\omega)$, is employed in respect of the first and second waveforms 400, 406:

$$S_{P1}(\omega) = S_{P2}(\omega) = S_P(\omega) \qquad (6)$$

Using this simplification, the estimation of the frequency domain equaliser coefficients reduces to:

$$\equiv(\omega) = \frac{S_{RxTx}(\omega)/S_{P1}(\omega)}{S_{RxCx}(\omega)/S_{P2}(\omega)} = \frac{S_{RxTx}(\omega)/S_P(\omega)}{S_{RxCx}(\omega)/S_P(\omega)} = \frac{S_{RxTx}(\omega)}{S_{RxCx}(\omega)} \quad (7)$$

Such an approach reduces the computation overhead of the coefficient processor 252 by reducing the calculation to be performed to a single division per subcarrier. The storage overhead is also reduced.

In this regard, in the context of the first and second waveforms comprising subcarriers, the estimation of the frequency domain equaliser coefficients can be expressed as:

$$\equiv(k) = \frac{-\Delta(k)}{\Theta(k)} = \frac{S_{RxTx}(k)}{S_{RxCx}(k)}$$

where k is a subcarrier number.

The common first and second waveforms 400, 406, albeit each waveform comprising signals at different frequency points and transmitted simultaneously, can be employed in relation to the first apparatus of FIG. 2 and the second apparatus of FIG. 4, wherein the first waveform 400 and the second waveform 406 both comprise a discretisation of a common underlying continuous frequency function, $S_P(\omega)$, but where the discretisation may be performed at different frequency points.

The exemplary embodiments of the invention set forth above are considered to be illustrative and not limiting. Various changes to the described embodiments may be made without departing from the spirit and scope of the invention.

The skilled person should appreciate that the above-described implementations are merely examples of the various implementations that are conceivable within the scope of the appended claims. Indeed, for example, the second waveform generator 230 can be coupled to the first plurality of inputs of the adaptive filter unit 231 instead of bypassing the adaptive filter unit 231 using first switching unit 229. In such an example, the first switching unit 229 can be employed to couple selectively the second waveform generator 230 to the adaptive filter unit 231 in favour of coupling the notional tapping point 228 to the adaptive filter unit 231, and when the second waveform generator 230 is coupled to the adaptive filter unit 231, the coefficients of the adaptive filter unit 231 can be set to unity gain.

In relation to the hybrid circuit 216 described herein, the skilled person should appreciate that any suitable construction can be employed. For example, in the above embodiment a transformer hybrid junction has been described. In another embodiment, a quadrature hybrid junction has been employed, although other variants, for example a 180° transformer hybrid junction, could be used. Other suitable kinds of hybrid junction can also be employed, for example a waveguide hybrid junction.

The systems and methods of the above embodiments may be implemented in a computer system (in particular in computer hardware or in computer software) or in specifically manufactured or adapted integrated circuits, in addition to the structural components and user interactions described. The methods of the above embodiments may be provided as computer programs or as computer program products or computer readable media carrying a computer program which is arranged, when run on a computer or other processor, to perform the method(s) described above.

The term "computer readable media" includes, without limitation, any medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

The invention claimed is:

1. An active interference cancellation apparatus for controlling duplex operation of signals to be transmitted and received, the apparatus comprising:
    a receiver chain comprising a received signal input node;
    a transmitter chain comprising a transmitter chain tap node and a transmitter output node;
    an auxiliary transmitter chain having an auxiliary chain input node operably coupled to the transmitter chain tap node, the auxiliary transmitter chain comprising an adaptive filter, a coefficient processor, and a cancellation signal output, the cancellation signal output being operably coupled to the received signal input node of the receiver chain; and
    an interpolation processor; wherein
    the coefficient processor is operably coupled to the receiver chain and the adaptive filter;
    the interpolation processor is arranged to cooperate with the coefficient processor;
    the transmitter chain is arranged to generate, when in use, a first waveform comprising a first plurality of frequency-separated signals;
    contemporaneously with the transmitter chain, the auxiliary transmitter chain is arranged to generate a second waveform comprising a second plurality of frequency-separated signals and apply the second waveform at the received signal input node;
    the receiver chain is arranged to receive a composite waveform comprising a waveform coupled from the output node of the transmitter chain to the received signal input node of the receiver chain and the second waveform from the auxiliary transmitter chain; and
    the first waveform does not comprise any signals required for determination of equaliser coefficients of the adaptive filter that coincide in frequency with the second plurality of frequency-separated signals of the second waveform.

2. The apparatus as claimed in claim 1, wherein the first waveform corresponds to a first plurality of subcarriers and the second waveform corresponds to a second plurality of subcarriers, and the first and second plurality of subcarriers are different.

3. The apparatus as claimed in claim 1, wherein the first waveform is absent of signals required for determination of the equalizer coefficients of the adaptive filter at frequencies occupied by the second plurality of frequency-separated signals of the second waveform.

4. The apparatus as claimed in claim 1, wherein the second waveform is absent of signals required for determination of the equalizer coefficients of the adaptive filter at frequencies occupied by the first plurality of frequency-separated signals of the first waveform.

5. The apparatus as claimed in claim 1, wherein the first plurality of frequency-separated signals and the second plurality of frequency-separated signals are interleaved in the frequency domain.

6. The apparatus as claimed in claim 1, wherein: the adaptive filter and the coefficient processor are arranged to estimate coefficients of a frequency domain self-interference transfer function modelling changes undergone by the first waveform in and between the transmitter chain and the receiver chain: the adaptive filter is arranged to estimate coefficients of a frequency domain cancellation transfer function modelling changes undergone by the second waveform in and between the auxiliary transmitter chain and the receiver chain; and the interpolation processor is arranged to estimate coefficients of the frequency domain self-interference transfer function in respect of frequencies absent from the first waveform and coefficients of the frequency domain cancellation transfer function in respect of frequencies absent from the second waveform.

7. The apparatus as claimed in claim 6, wherein the self-interference transfer function models processing of the first waveform performed by the transmitter chain, the receiver chain and coupling of the first waveform from the transmitter chain to the receiver chain; and the cancellation transfer function models processing of the second waveform performed by the transmitter chain, the receiver chain and interconnecting circuits.

8. The apparatus as claimed in claim 6, wherein the interpolation processor is arranged to estimate the coefficients of the frequency domain self-interference transfer function in respect of frequencies respectively between adjacent frequencies present in the first waveform.

9. The apparatus as claimed claim 6, wherein the interpolation processor is arranged to estimate the coefficients of the frequency domain cancellation transfer function in respect of frequencies respectively between adjacent frequencies present in the second waveform.

10. The apparatus as claimed in claim 6, wherein the coefficient processor is arranged to receive the estimated frequency domain self-interference transfer function and the estimated frequency domain cancellation transfer function from the interpolation processor, the coefficient processor being arranged to calculate the equalizer coefficients for the adaptive filter using the estimated frequency domain self-interference transfer function and the estimated frequency domain cancellation transfer function.

11. The apparatus as claimed in claim 10, wherein the coefficient processor is arranged to calculate filter coefficients of the adaptive filter by negative sign division of the estimated frequency domain self-interference transfer function by the estimated frequency domain cancellation transfer function.

12. The apparatus as claimed in claim 1, wherein the adaptive filter and the coefficient processor are arranged to modify a tapped transitory signal based on a transmission signal generated in the transmitter chain so that the modified tapped transitory signal when completely processed by the auxiliary transmitter chain results in a cancellation signal received at the received signal input node of the receiver chain cancelling the transmission signal coupled from the transmitter output node to the received signal input node.

13. The apparatus as claimed in claim 12, wherein the auxiliary transmitter chain comprises the adaptive filter, the coefficient processor, and transmitter chain processors, the auxiliary chain input node of the auxiliary transmitter chain being operably coupled to the adaptive filter and the coefficient processor, the transmitter chain processors being arranged to complete processing of the tapped transitory signal in accordance with a desired modulation scheme for the transmitter chain.

14. The apparatus as claimed in claim 12, wherein the adaptive filter configured using the equalizer coefficients is arranged to modify the tapped transitory signal so that the auxiliary transmitter chain provides, at the received signal input node of the receiver chain, an antiphase estimate of the received transmission signal coupled from the transmitter output node of the transmitter chain to the received signal input node of the receiver chain.

15. A signal isolation control apparatus comprising the active interference cancellation apparatus as claimed in claim 1, the signal isolation control apparatus further comprising:
a hybrid junction comprising an input node, an output node, an antenna node for coupling to an antenna, and a balance node; wherein
the received signal input node is operably coupled to the output node of the hybrid junction circuit;
the transmitter output node of the transmitter chain is operably coupled to the input node of the hybrid junction; and
the waveform coupled from the transmitter chain to the receiver chain is leaked by the hybrid junction from the input node thereof to the output node thereof.

16. The apparatus as claimed in claim 15, further comprising:
a balancing impedance controller having an input operably coupled to an output of the receiver chain; and a variable impedance having a control input operably coupled to an output of the balancing impedance controller, the variable impedance also being operably coupled to the balance node of the hybrid junction.

17. A signal isolation control apparatus comprising the active interference cancellation apparatus as claimed in claim 1, the signal isolation control apparatus further comprising:
a transmit antenna operably coupled to the transmitter output node; and
a receive antenna operably coupled to the receive signal input node.

18. A duplexing apparatus comprising the signal isolation control apparatus as claim 15.

19. A wireless transceiver apparatus comprising the active interference cancellation apparatus as claimed in claim 1.

20. A communications device comprising the active interference cancellation apparatus as claimed in claim 1.

21. A method of actively cancelling interference for duplexed communication of signals, the method comprising:
providing a receiver chain;
providing a transmitter chain;
providing an auxiliary transmitter chain comprising an adaptive filter and a coefficient processor;
the transmitter chain transmitting a first waveform comprising a first plurality of frequency-separated signals;
the auxiliary transmitter chain contemporaneously generating a second waveform comprising a second plurality of frequency-separated signals;
applying the second waveform at an input of the receiver chain;
coupling the first waveform from the transmitter chain to the receiver chain;
the receiver chain receiving a composite waveform comprising a waveform coupled from the transmitter chain to the receiver chain, and the second waveform from the auxiliary transmitter chain; and the first waveform does not comprise any signals required for determination of equaliser coefficients of the adaptive filter that coincide in frequency with the second plurality of frequency-separated signals of the second waveform.

\* \* \* \* \*